May 10, 1955  W. H. WANNAMAKER, JR  2,707,880
RELATIVE HUMIDITY MEASURING APPARATUS
Filed Feb. 18, 1950  2 Sheets-Sheet 1
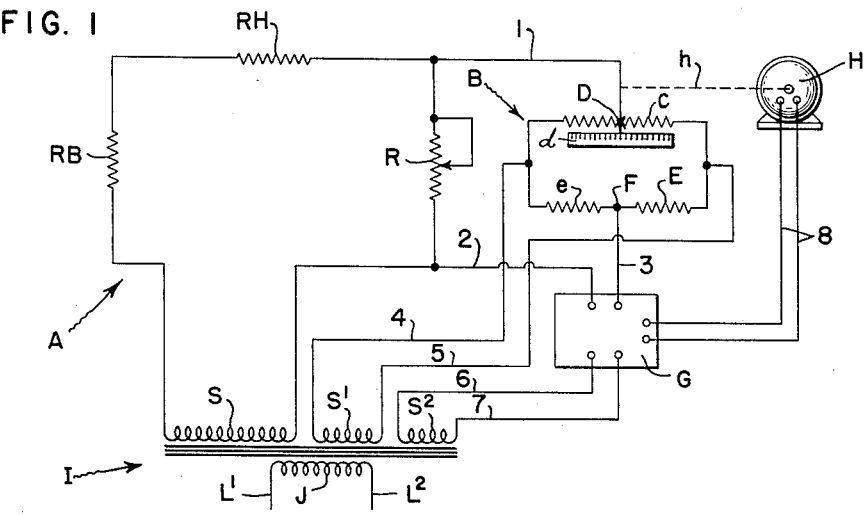
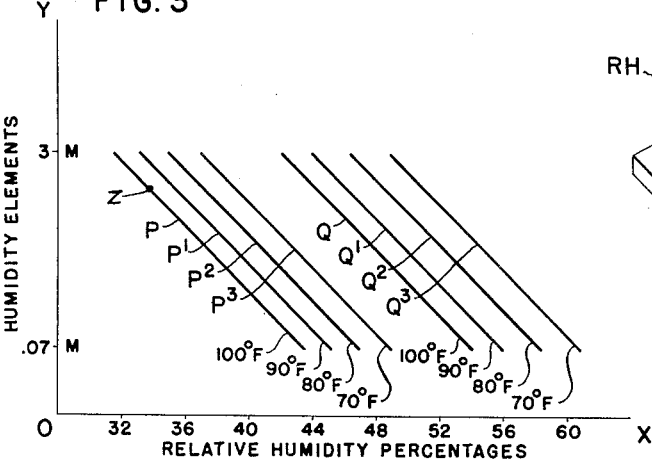
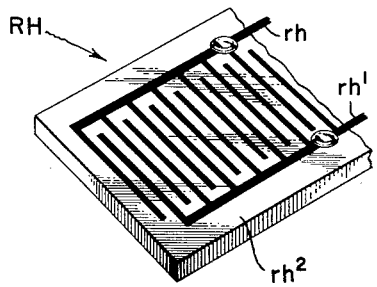
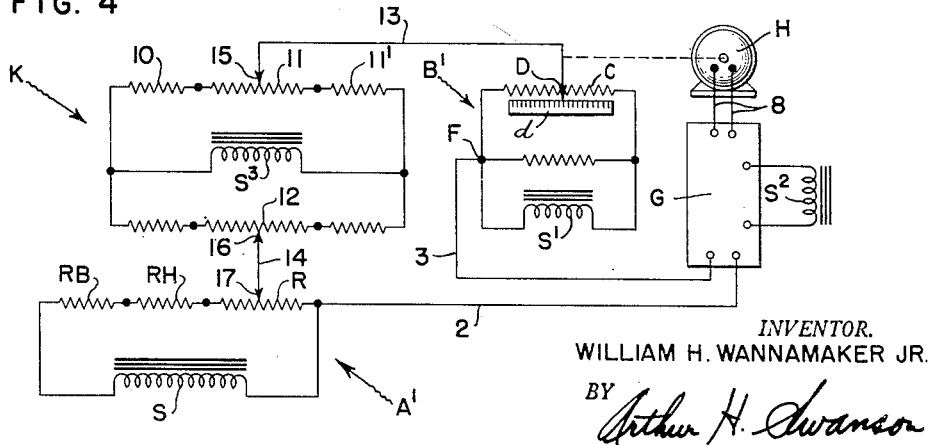
*INVENTOR.*
WILLIAM H. WANNAMAKER JR.
BY
ATTORNEY.

INVENTOR.
WILLIAM H. WANNAMAKER JR.

United States Patent Office 2,707,880
Patented May 10, 1955

2,707,880

RELATIVE HUMIDITY MEASURING APPARATUS

William H. Wannamaker, Jr., Flourtown, Pa., assignor to Minneapolis-Honeywell Regulator Company, Minneapolis, Minn., a corporation of Delaware Application February 18, 1950, Serial No. 144,996

14 Claims. (Cl. 73—335)

The general object of the present invention is to provide improved apparatus for measuring and recording the relative humidity of the atmosphere at one or more points. More specifically stated, the general object of the present invention is to combine simple and effective means for creating a minute alternating voltage varying in accordance with variations in the relative humidity to be measured, with a self-balancing potentiometric measuring instrument of known type including a measuring bridge circuit comprising a slide wire resistor, a rebalancing motor, and electronic amplifying and motor drive means for adjusting a slider contact along said slide wire resistor on and in accordance with variations in the said voltage which varies with changes in the relative humidity to be measured. Such an instrument may, and ordinarily does, include means for indicating and recording the value of the relative humidity measured, and for automatically producing a control effect in response to changes in the relative humidity measured. One widely used, commercially available form of an instrument of the above mentioned type, which is suitable for use in the practice of the present invention, is disclosed in the Wills Patent 2,423,540 of July 8, 1947.

A specific object of the invention is to provide a combination of the type described, in which the means for producing the minute voltage directly measured, comprises a circuit including a source of alternating current connected in series with three resistance elements: namely, a humidity responsive resistor, a relatively large ballast resistor and a relatively small resistor across which the voltage to be measured is produced.

Another specific object of the invention is to provide a circuit of the character last mentioned, in which the resistance values of the circuit elements are so related that under normal operating conditions, the ratio of the current which the current source causes to flow through the small voltage reducing resistor, to the relative humidity measured may be kept desirably constant, although the resistance of the humidity responsive resistor varies in a non-linear proportion to the variation in the relative humidity measured. In the preferred form of my invention, the humidity responsive resistor employed is of a known type in which the logarithm of its varying resistance varies in linear proportion to the variation in the relative humidity of the atmosphere measured. With such a humidity responsive resistor, I have found it to be practically feasible to keep the ratio of the current flow through the relatively small resistor, to the relative humidity measured, approximately constant, by so relating the fixed resistance of the ballast resistor to the variable resistance of the humidity responsive resistor that the reciprocal of their combined resistances varies in approximately linear proportion to the variation in the relative humidity measured.

Another specific object of the invention is to provide means for energizing various elements of the apparatus from a common available source of alternating current in such manner as to minimize measuring errors which variations in the voltage of said current source tend to produce.

Another specific object of the invention is to provide the measuring apparatus with simple and effective means for compensating for the effects, on the measurement of the relative humidity of an atmosphere, of variations in the temperature of the atmosphere. A further specific object of the invention is to provide a simple and effective combination and means for separately measuring a plurality of voltages, each of which is responsive to the relative humidity of a different atmosphere, with a single multi-point measuring and controlling instrument of known type.

Applicant's combination of the means which he has devised for obtaining the voltage which is a measure of relative humidity and a null type, self-balancing potentiometer including electronic amplifying means of the general type disclosed in said Wills patent is especially advantageous, because the low resistance resistor across which said voltage is produced serves as the coupling element between the high impedance, humidity responsive circuit, of which it forms a part, and the relatively low impedance input circuit of the potentiometric measuring circuit of which said resistor also forms a part.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a diagram illustrating a simple embodiment of the invention;

Fig. 2 is a perspective view illustrating a known form of relative humidity responsive resistor;

Fig. 3 is a chart including a plurality of curves illustrating the variations in resistances of relative humidity resistors used in the practice of the invention, produced by temperature and relative humidity variations;

Fig. 4 is a diagram illustrating apparatus for measuring the relative humidity of the atmosphere and including means for compensating for variations in the temperature of the atmosphere.

Figure 5:
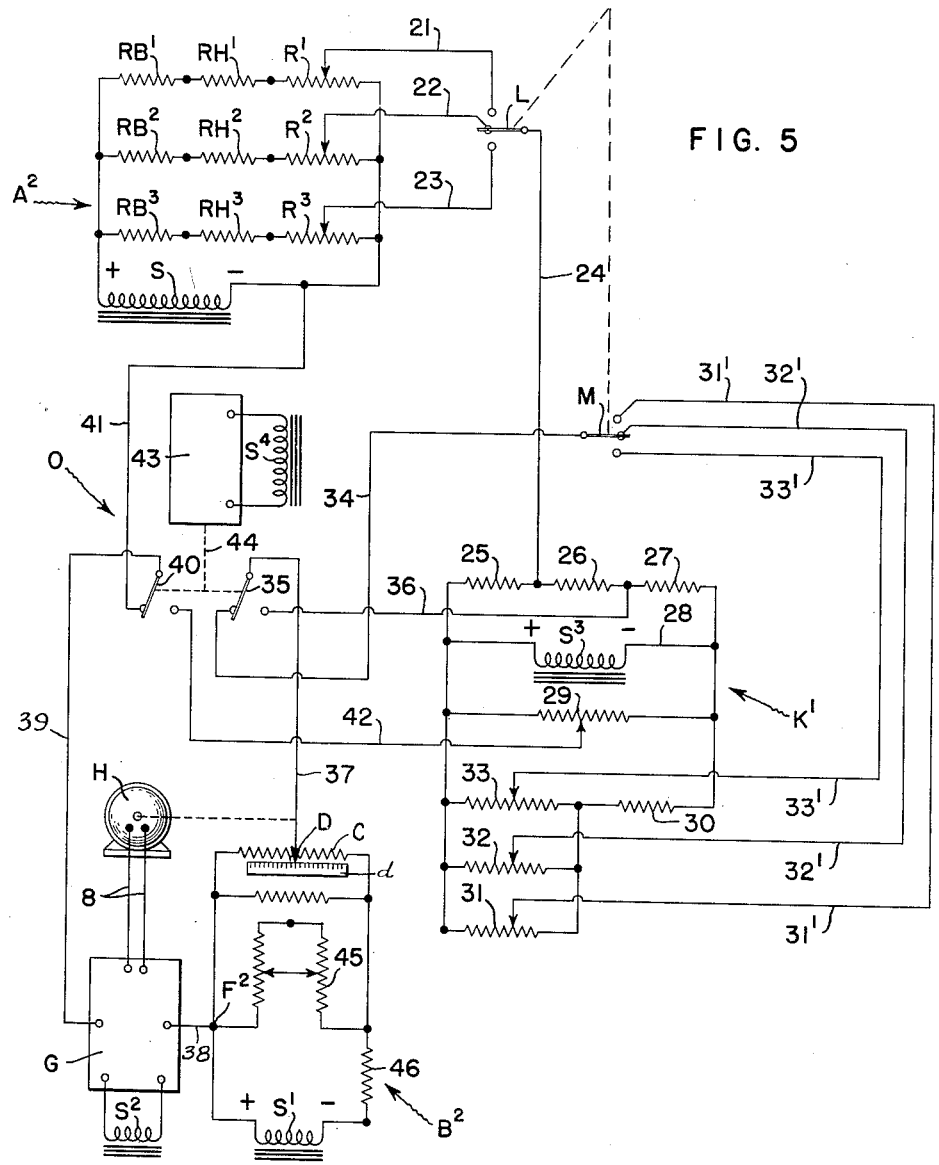
Fig. 5 is a diagram illustrating the use of a single instrument for measuring a plurality of relative humidities separately and selectively.

The embodiment of my invention illustrated diagrammatically by way of example in Fig. 1, comprises a circuit A through which an electric current varying with the relative humidity of the atmosphere to be measured is caused to flow, and a measuring circuit B operative to provide a measure of the varying current flow.

As shown, the circuit A, which may be called the relative humidity circuit, comprises a relative humidity resistor RH, a relatively large ballast resistor RB, a source of alternating current S and a relatively small measuring resistor R, all connected in series. The voltage source S is one of a plurality of secondary windings of a transformer I having a primary winding J connected between alternating current supply conductors L' and L². The latter may be branches of a power circuit or other available source of alternating current of customary voltage and frequency, for example 115 volts, and 60 cycles per second.

The measuring bridge circuit B is a split potentiometer bridge circuit comprising a branch including a slide wire C and a slider contact D engaging, and adjustable along the length of, the slide wire C, and connected by a conductor 1 to one terminal of the resistor R of the circuit A. The circuit B also includes a second branch connected in parallel with the first mentioned branch and including resistors E and e, connected in series with one another. A point F in said second branch between the resistors E and e is connected to the second terminal of the resistor R by means including conductors 2 and 3 and the input impedance of an electronic amplifier and motor drive device G. A second secondary winding S' of the transformer I has one terminal connected by a conductor 4 to one terminal of the slide wire C and to one terminal of the resistor e, and has its second terminal connected by a conductor 5 to the second terminal of the slide wire C and the terminal of the resistance E connected thereto. A third secondary winding $S^2$ of the transformer I has its terminals connected by conductors 6 and 7 to the energizing terminals of the amplifier and motor drive device G.

In the normal balanced condition of the apparatus shown in Fig. 1, the voltage across the resistor R is equal in magnitude and opposite in phase to the voltage between the measuring bridge point F and the point engaged by the contact D. On a change in the relative humidity measured, and a corresponding change in the voltage across the resistor R, a current flow is produced in the circuit comprising the conductors 2 and 3 and the input impedance of the device G. The latter then energizes a rebalancing motor H through conductors 8 for operation in the direction and to the extent required for the adjustment of the slider contact D through a mechanical link h, as needed to restore equality in magnitude of the voltage between the points D and F and the voltage across the resistor R. A scale d alongside the slide wire C shown in Fig. 1, and also in Figs. 4 and 5, provides a measure of the variations in position of the contact D along the slide wire C, and thereby provides a measure of the variations in the relative humidity to which the resistor RH is exposed.

As previously stated, the bridge circuit B, amplifier and motor drive device G, and motor H may form parts of a measuring and control instrument of known type. In particular, the elements B, G and H may form parts of a self-balancing potentiometric instrument of the general type disclosed in the above mentioned Wills patent. The particular instrument illustrated and described in detail by way of example in said patent, includes means for converting a small direct current voltage to be measured into alternating current preparatory to its amplification. No such converter is needed or included in the apparatus shown in Fig. 1, since the voltage developed across the measuring resistor R is alternating and not unidirectional.

The relative humidity resistor RH is of the general character disclosed in the Dunmore Patents 2,295,570 of September 15, 1942, and 2,285,421 of June 9, 1942, in that it comprises side-by-side, spaced apart conductors mounted on a support formed of or covered by insulation and coated with a film of hygroscopic material such as lithium chloride. The conductivity of such a film increases in a predetermined but non-linear manner as the relative humidity of the atmosphere in contact with the film increases. Fig. 2 illustrates the particular type and form of the resisor RH which I now prefer to use in the practice of my invention. The resistor shown in Fig. 2 is a commercially available element known as the "MH Relative Humidity Sensing Element." As shown in Fig. 2, the resistor RH comprises two thin comb shaped conductors rh and rh' formed of gold film, with the teeth of each extending into the spaces between the teeth of the other. The conductors rh and rh' are cemented or otherwise secured to one side of a flat plate $rh^2$ of transparent insulating material. The side of the plate $rh^2$ to which the conductors rh and rh' are affixed is coated with lithium chloride or other suitable hygroscopic material.

In the use of the present invention, it has been found practically difficult or impossible to obtain accurate linear measurements of relative humidities lower than about 16%, or higher than about 88.5% with the apparatus now being used in the practice of the present invention. To obtain suitably accurate approximate linear measurements of relative humidity through a working range of from 16% to 88½% relative humidity with apparatus of the general character illustrated diagrammatically in Fig. 1, it has been found essential to employ a series or set of interchangeable relative humidity resistors. Each of said resistors has resistance characteristics which differ from those of each other resistor in the set as required to permit each resistor to be used in measuring the relative humidity in a particular portion of said working range, which is different from the portions of said range with which the other relative humidity resistors of the series are used. The different relative humidity resistors so used may all be generally similar in construction, and of the type shown in Fig. 2, and differ significantly from one another only in respect to the physical characteristics of their respective metal and/or hygroscopic film portions, whereby similar changes in the relative humidity of the atmosphere to which they are exposed, produce different changes in the conductivity of the different elements.

Each of the resistors RH employed in measuring relatively low relative humidities, can ordinarily be expected to provide accurate measurements over a relative humidity range of about 10%. Each of the resistors RH used in measuring the relative humidity in a particular portion of the working range in which the relative humidity is relatively high, can ordinarily be expected to give accurate measurements in a portion of the range in which the variation in relative humidity amounts to about 12%. However, in the commercial use of the present invention, a series of eight different relative humidity resistors RH having respectively different resistance characteristics are employed to cover eight different sections of the working humidity range from 16% to 88.5%, so that the average variation in relative humidity measured by each such resistor is a little over 9%.

The performance and operative results obtained by the use of different relative humidity resistors of a group of the character above described, are illustrated in the chart shown in Fig. 3. In that chart, the side-by-side straight line curves P, P', $P^2$, and $P^3$ show measuring results obtainable with one particular relative humidity resistor RH in the above mentioned series, at atmospheric temperatures of 100, 90, 80 and 70 degrees F., respectively. As shown, the curve P illustrates the variation in the resistance of said particular resistor when the atmosphere to which it is exposed has a temperature of 100° and has a relative humidity varying from a minimum of a little less than 32% to a maximum of a little more than 45%. Similarly, the curve $P^3$ illustrates the variations in the resistance of the same resistor when exposed to an atmosphere having a temperature of 70° F. and a relative humidity varying from about 36¾% to a little less than 50%. The curves P' and $P^2$ are intermediate the curves P and $P^3$ of the curves which are substantially parallel to one another.

In Fig. 3, the side-by-side straight line curves Q, Q', $Q^2$ and $Q^3$ show the measuring results obtainable with a second particular resistor RH of the above mentioned series which is adapted to measure the relative humidity of an atmosphere which varies from a minimum of about 45% when the atmospheric temperature is 100° F., to a maximum of a little less than 65% when the atmospheric temperature is 70° F. It is to be noted that while the measurements shown in Fig. 3 are those obtainable with an atmospheric temperature range varying from a minimum of 70° F. to a maximum of 100° F., the invention is well adapted for measuring variations in the relative humidity of an atmosphere at temperatures above 100° F. and at temperatures below 70° F. The only change needed in the apparatus diagrammatically shown in Fig. 1, to obtain relative humidity measurements in the different temperature ranges, is the replacement of one resistor RH by another resistor having suitably different resistance characteristics.

While the curves Q, Q', Q² and Q³ are substantially parallel to one another, they are inclined to the horizontal at a somewhat smaller angle than are the curves P, P', P² and P³. The inclination to the horizontal of each group of curves for each different relative humidity resistor RH in the series of eight resistors, progressively decreases as the portion of the working range of relative humidity measurements collectively shown by the group of curves increases.

In the chart shown in Fig. 3, any point on any one of the eight straight line curves P, P'–Q³, indicates the measurement results obtainable with the corresponding sensing element RH of the MH type included in a series of eight such resistors for interchangeable connection in the circuit A shown in Fig. 1, under particular operating conditions. Thus the projection of the point Z of the curve P onto the vertical line OY indicates the resistance of the corresponding sensing element RH under the operating condition in which the relative humidity of the atmosphere being measured, is that indicated by the projection of the point Z onto the line OX when the temperature of the atmosphere is 100° F. The measurement scale of the resistance values indicated by different points along the line OY is a logarithmic scale. The scale of the relative humidity indicated by different points along the line OX is a linear scale.

The actual resistance and humidity values represented by the projections onto the lines OY and OX of any particular point on any of the straight line curves shown in Fig. 3, depend, theoretically, upon the total resistance in the circuit A and on the humidity of the atmosphere to which the humidity responsive sensing element RH is exposed. In practice, the resistance of the resistor R is so small in comparison with the resistances of the resistors RB and RH, that no significant error is made in assuming that the total resistance of the circuit A at any instant is approximately equal to the sum of the constant resistance of the resistor RB and the varying resistance of the humidity responsive sensing element RH. Resistors RH of the above described type may be designed and constructed to have different resistance values. However, as Fig. 3 indicates, the logarithm $_{10}$ of the resistance of each such resistor varies in linear proportion to the variation in the relative humidity of the atmosphere to which the resistor is exposed. Each humidity responsive sensing element whose characteristics are illustrated in Fig. 3, varies from a minimum resistance of seven hundredths of one megohm, when exposed to the maximum relative humidity which that resistor is designed to measure, to a maximum resistance of three megohms when exposed to the minimum relative humidity which that resistor is designed to measure.

Linear measurements of the relative humidities to which any such resistor is exposed when connected in the circuit A of Fig. 1, may be obtained if the constant resistance of the ballast resistor RB in that circuit is 330,000 ohms. In such case, the reciprocal of the total resistance in the circuit A will vary in approximately linear proportion to the variation in relative humidity measured over a limited range. With the two resistors RH giving the straight line curves P—Q³ shown in Fig. 3, and with the other resistors RH of the series of resistors interchangeably usable in the circuit shown in Fig. 1, the maximum error in the linear relative humidity percentage measurements made need not be more than about 1%.

In the apparatus shown in Fig. 1, variations in the temperature of the atmosphere whose relative humidity is measured are not compensated. Such compensation is unnecessary in uses of the apparatus under conditions in which little or no variation in the temperature of the atmosphere can occur, and may also be practically unimportant in some cases in which substantial variations in said temperature can occur. Under conditions in which variations in atmospheric temperature may objectionably effect the accuracy of the humidity measurements obtained, the temperature variations may be compensated by the addition to the apparatus shown in Fig. 1 of suitable temperature compensating provisions, such for example, as the bridge K shown in Fig. 4. The bridges A' and B' shown in Fig. 4 and the bridges A and B of Fig. 1 differ in form but operatively are substantially alike.

The temperature compensating bridge K of Fig. 4 comprises a temperature responsive bulb 10 or resistor formed of nickel or other material having a substantial positive temperature coefficient of resistance. The temperature responsive resistance 10 is maintained at the temperature of the element RH, ordinarily being located in immediate proximity to the latter. The resistance 10 is connected in a branch of the bridge K including a slide wire resistance 11 and a resistor 11'. The bridge K comprises a second resistance branch including a slide wire resistor 12. The bridge K is energized by a winding S³ which may be a secondary winding of a transformer generally similar to the transformer I of Fig. 1, but having the secondary winding S³ in addition to secondary windings S, S' and S², which are respectively associated with the bridge A', the bridge B' and the amplifier and motor drive unit G.

In Fig. 4, one terminal of the resistor R is connected through the conductors 2 and 3, and the input circuit of amplifier G, to a suitable point in the bridge B', generally as one terminal of the resistance R is connected to the bridge B of Fig. 1. In Fig. 4, however, the slider contact D is connected to the resistor R through conductors 13 and 14, and the bridge K. The conductor 13 is connected to the bridge K through a slider contact 15 which engages and is manually adjustable along the slide wire resistance 11. The conductor 14 is connected to the bridge K through a slider contact 16 which engages and is manually adjustable along the slide wire resistance 12. The conductor 14 is connected to the resistor R through a slider contact 17 and is manually adjustable along said resistor.

Adjustments of the slider contacts 15 and 16 are calibrating adjustments which linearly shift the measuring span and zero of the measuring instrument. That is to say, adjustments of the contacts 15 and 16 along their associated slide wire resistances will result in a change in the instrument reading for any given relative humidity value to which the sensing element RH is subjected and also will result in a linear shift in the range of instrument readings produced by a given change in said relative humidity. To facilitate the calibrating adjustments, the resistors 11 and 12 are advantageously so arranged that a given adjustment of the contact 15 along the resistance 11 will produce a relatively small or fine adjustment, while a similar adjustment of the contact 16 along the resistance 12 will produce a relatively large or coarse adjustment. While adjustments of the slider contact 15 tend to produce a change in the temperature compensating effect of the temperature responsive resistance 10, such changes are kept to a minimum by making the resistance of the slide wire resistor 11 a small part of the total resistance of the branch of the bridge K including the resistors 10, 11 and 11'. Thus, in a practical operating embodiment of the present invention, the magnitude of the slide wire resistance 11 is 0.2 ohm, the magnitude of resistor 11' is 20 ohms, and the resistor 10 is so chosen as to exhibit a resistance of 600 ohms at 100° F.

The adjustment of the contact 17 along the resistance R is a calibrating adjustment which modifies the measuring span of the measuring instrument; i. e., an adjustment of the contact 17 along the resistance R of Fig. 4 to the left or right will respectively increase or decrease the change in the instrument reading produced by a given change in the relative humidity measured by the relative humidity responsive sensing element RH. A similar modification in the span of the instrument may be effected in the Fig. 1 arrangement by short circuiting more or less of the resistor R.

In various uses of apparatus for measuring relative humidity it is desirable to obtain, along with measurements of the relative humidity of an atmosphere, measurements of the temperature of that atmosphere. Simple and effective apparatus for effecting measurements of the relative humidity and temperature of an atmosphere is shown in Fig. 5. The apparatus shown in Fig. 5 also includes means by which the operator can readily change the relative humidity resistor included in the measuring circuit when and as changes in the range of the relative humidity to be measured make such change necessary or desirable.

The measuring circuit $A^2$ of Fig. 5 differs from the measuring circuit A of Fig. 1, essentially in that it includes three relative humidity resistors RH′, $RH^2$ and $RH^3$, each connected in an individual measuring circuit branch including a corresponding ballast resistor RB′, $RB^2$ and $RB^3$ and a corresponding adjustable measuring resistor R′, $R^2$ or $R^3$. The three circuit branches respectively including the resistors RH′, $RH^2$ and $RH^3$ are connected in parallel with one another and each in series with the secondary winding S of an energizing transformer like the transformer I of Fig. 1. The measuring resistor R′ is shown as a slide wire resistor engaged by a slider contact which is connected to a terminal conductor 21. The measuring resistors $R^2$ and $R^3$ are similar slide wire resistors with associated slider contacts connected to terminal conductors 22 and 23, respectively. The terminal conductors 21, 22 and 23 are connected to separate stationary switch contacts, arranged to be separately engaged by a movable selector switch member L, as the latter is manually adjusted into one or another of three operating positions. The switch member L is connected by a conductor 24 to a circuit K′.

The circuit K′ is a temperature compensating bridge circuit, one branch of which includes resistors 25 and 26 and a temperature sensitive resistor 27, each in series with the other two. The conductor 24 is connected to the connected ends of the resistors 25 and 26. The above mentioned branch of the circuit K′ is connected in series with a second or energizing branch 28, which includes the secondary winding $S^3$ of the above mentioned transformer. The bridge K′ includes third and fourth branches, each connected in series with the energizing branch 28 and in parallel with the branch including the resistors 25, 26 and 27. The third branch includes a slide wire resistance 29, and the fourth branch includes a resistance 30, and three slide wire resistors 31, 32 and 33 which are connected in parallel with one another and each in series with the resistance 30.

Individual slider contacts, respectively engaging the slide wires 31, 32 and 33, are connected to terminal conductors 31′, 32′ and 33′, respectively. Those terminal conductors are connected to separate switch contacts adapted to be engaged one at a time by a manually adjustable switch member M. As diagrammatically shown, the switch member M is mechanically connected to the switch member L, and the two switches and associated contacts are so arranged that when the contact L engages the stationary contact connected to the terminal conductor 21, the switch member M engages the stationary contact connected to the terminal conductor 31′, and when the contact L is shifted into connection with the terminal conductor 22 or 23, the contact M will be shifted into the position in which it is connected to the terminal conductor 32′ or 33′ respectively.

The switch blade M is connected by a conductor 34 to a stationary switch contact which is engaged by a movable switch member 35 in one position of the latter. In a second position of the movable switch member 35, the latter engages a stationary switch contact connected by a conductor 36 to the junction of the resistors 26 and 27 of the circuit K′. The movable switch member 35 is connected by a conductor 37 to the slider contact D engaging the slide wire C of a measuring circuit $B^2$ which differs in form, and in its adjustable element 45, from the measuring circuit B of Fig. 1, and from the measuring circuit B′ of Fig. 4. A point $F^2$ of the measuring circuit $B^2$ is connected by a conductor 38 to one input terminal of the amplifier and motor drive device G. The second input terminal of the device G is connected by a conductor 39 to a movable switch member 40.

The switch member 40 is adjustable between two positions, in one of which it connects the input circuit of the device G through a conductor 42 to the bridge circuit K′. The switch members 35 and 40 form parts of an automatic switch mechanism O for simultaneously shifting said switch members between their positions in which they are respectively connected to the conductors 34 and 41, into their positions in which they are respectively connected to the conductors 36 and 42. The conductor 41 connects a stationary contact of the switch mechanism O to a conductor portion of the circuit $A^2$ which connects the secondary winding S to the measuring resistors R′, $R^2$ and $R^3$. The conductor 42 connects a second stationary contact of the switch mechanism O to a slider contact engaging and adjustable for calibration purposes along the slide wire resistor 29 of the temperature compensating bridge K′. The previously mentioned stationary switch contacts to which the conductors 34 and 36 are connected also form parts of the switch mechanism O. Advantageously, the switch mechanism O is automatically actuated, as by means of an electric timing device 43 of known type and energized by a secondary winding $S^4$ of the transformer I. The device 43 operates through a reciprocating rod 44 to give to and fro movements to a cross head which supports and is insulated from the switch members 35 and 40. The cross head including the contacts 35 and 40 may well be moved through its cycle three or four times a minute.

With switches L and M in their respective positions shown in Fig. 5, and with the switch members 35 and 40 connected to the conductors 34 and 41, respectively, the apparatus shown in Fig. 5 is operative to measure relative humidity with a suitable temperature compensating effect, by the conjoint use of the relative humidity resistor $RH^2$, the temperature compensating resistor 27, and the slide wire resistor 32. With the switch members 35 and 40 in engagement with the switch contacts connected to the conductors 36 and 42, respectively, the apparatus shown in Fig. 5 is operative to measure the temperature of the temperature responsive resistor 27 irrespective of the positions of the switch members L and M. The adjustment of the switch members L and M into the positions in which they are respectively connected to the conductors 21 and 31′, adjusts the apparatus shown in Fig. 5 for use in measuring the relative humidity to which the resistor RH′ is exposed by the use of the resistor 27 and the slide wire resistor 31, and alternately measuring the temperature of the resistor 27. Similarly, when the switch members L and M are moved into engagement with the stationary switch contacts connected with the conductors 23 and 33′ respectively, the apparatus shown in Fig. 5 is in position to measure the relative humidity of the atmosphere to which the resistor $RH^3$ is exposed and to alternately measure the temperature of the resistor 27.

As those skilled in the art will understand, the precise values of the different circuit elements included in the circuit network shown in Fig. 5 are not critical, but the values of essential elements of the network must be suitably related for optimum measuring results. The values of the essential elements of the circuit $A^2$ may well be those previously stated for the essential elements of the circuit A of Fig. 1. The relative humidity resistors RH′, $RH^2$ and $RH^3$ may each be like one or another of the series of resistors provided for interchangeable use in the Fig. 1 arrangement. The voltage across the energizing secondary transformer winding S of Fig. 5 may well be 10 volts as in Fig. 1.

In the temperature responsive circuit K′ of Fig. 5, the resistors 25 and 26 may have resistances of 28.1 and 84.2 ohms respectively, and the resistance of the temperature sensitive resistance 27 may be 600 ohms at 100° F. The voltage across the energizing winding S³ may be 3 volts. The resistance of the slide wire resistor 29 may be 500 ohms. The resistance of each of the resistors 31, 32 and 33 may be 100 ohms. The resistance of the resistor 30 may be 509.5 ohms. The alternating current energizing voltage supplied to the measuring bridge circuit B² by the transformer secondary winding S' may be 1 volt. The aggregate resistance of the slide wire resistor C and its resistance shunt may be 20 ohms. The adjustable resistance 45 in parallel with the slide wire resistance may have a maximum value of .4 ohm. A resistor 46 connected in series with the secondary winding S' to the terminals of the slide wire resistor C, variable resistance 45 and to the terminals of the shunt, may have a resistance of 5 ohms.

As will be apparent, the apparatus shown in Fig. 5 can be used in successively measuring the relative humidity of the atmospheres in three different places in which the resistors R', R² and R³ are respectively placed. For such use, a switching mechanism of known type may be used to cause the switch blade L to successively engage the contacts connected to the conductors 21, 22 and 23 in regular succession in each of regularly repeated cycles. For such use, the recording instrument employed may be of known type adapted to make six records: namely, a separate record for the relative humidity of each of the resistors RH', RH² and RH³, and a separate record for the temperature of each of those resistors. For such use, the three resistors RH', RH² and RH³ may be identical if the relative humidity at the different places at which they are located are approximately the same, or they may be adapted for use in different relative humidity ranges when this is made desirable as a result of the existence of different relative humidities at the different places at which they are located.

Alternatively, the apparatus shown in Fig. 5 may be used in measuring relative humidity at one place at which all three of the resistors RH', RH² and RH³ are located. For such use, the three humidity responsive resistors may be adapted to measuring relative humidity in three different ranges, thus tripling the effective range of relative humidity variation which can be measured without the replacement in the circuit A² of one humidity responsive resistor by another.

In Fig. 5, the adjustments along the slide wire resistors R', R² and R³ of the associated slider contacts are measuring span or sensitivity adjustments. The adjustments along the slide wires 31, 32 and 33 of the slider contacts respectively engaging said slide wires, are zero adjustments affecting the relative humidity percentage measurements. The adjustment along the slide wire 29 of the slider contact engaging that resistor, is a zero adjustment for use in the measurement of the temperature of the resistor 27. The adjustment of the resistance in circuit of the resistor 45, is an adjustment of the measuring span of the potentiometer bridge B². The adjustments just mentioned are so called factory adjustments, i. e. adjustments made at the time the apparatus is originally assembled and calibrated. Ordinarily, such adjustments need not be modified or repeated in the subsequent use of the apparatus. In Fig. 5, the plus and minus signs associated with the transformer secondary windings S, S', and S³ indicate the desired phase relations of the currents induced in those windings.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Apparatus for linear measurement of relative humidity, comprising in combination a circuit including in series a resistor means increasing and decreasing in resistance in a predetermined manner between maximum and minimum values as the relative humidity of the atmosphere to which said resistor means is exposed increases and decreases, and including constant resistance means so related in value to the resistance of said resistor means that the reciprocal of the total resistance in said circuit varies in approximately linear proportion to the relative humidity of said atmosphere, energizing means for creating a current flow in said circuit, and means for measuring said current flow.

2. Apparatus as specified in claim 1, in which said measuring means is of the self-balancing type including a bridge circuit unbalanced by a change in the current flow measured, and including means including a second energizing means and responsive to bridge circuit unbalance for rebalancing said bridge circuit, in which said energizing means are separate transformer secondary windings, and in which said apparatus includes a transformer primary winding in inductive relation with each of said secondary windings.

3. Apparatus for measuring relative humidity, comprising in combination a circuit including in series a first resistor varying in resistance in a predetermined manner from a maximum resistance to a minimum resistance as the relative humidity of the atmosphere to which said resistor is exposed increases through a predetermined range, a ballast resistor having a resistance intermediate in value between said maximum and minimum resistances, a fixed resistor having a resistance substantially smaller than said minimum resistance, an energizing device for creating an alternating current flow in said circuit, the value of the resistance of said ballast resistor being so related to the resistance of said first resistor that the reciprocal of the total resistance in said circuit varies in approximately linear proportion to the relative humidity of said atmosphere, whereby the value of said current varies in approximately linear proportion to said relative humidity, and electrical measuring means operatively connected to said fixed resistor for measuring the current flow through that resistor.

4. Apparatus for measuring relative humidity, comprising in combination a circuit including in series a first resistor varying in resistance in a predetermined manner from a maximum resistance to a minimum resistance as the relative humidity of the atmosphere to which said resistor is exposed increases through a predetermined range, a ballast resistor having a resistance intermediate in value between said maximum and minimum resistances, a fixed resistor having a resistance substantially smaller than said minimum resistance, an energizing device for creating an alternating current flow in said circuit, and electrical measuring means operatively connected to said fixed resistor for measuring the current flow through that resistor, the logarithm of the resistance of said first resistor and the reciprocal of the total resistance of said circuit each varying in approximately linear proportion to the change in relative humidity.

5. Apparatus for linear measurement of relative humidity, comprising in combination a variable resistor varying in resistance in a predetermined manner from a maximum resistance to a minimum resistance as the relative humidity of the atmosphere to which said resistor is exposed increases through a predetermined range, a first closed circuit including said variable resistor, a ballast resistor, and an inductive winding connected in series, a second closed circuit including a second inductive winding and a slide wire resistor connected in series, circuit energizing means comprising a third winding in inductive relation with each of the two first mentioned windings and having terminal conductors for connection to a source of alternating current, a measuring circuit coupling said first and second circuits and including means for comparing a potential drop in a regulable portion of said slide wire resistor with a potential drop in said first circuit which increases and decreases as the resistance of said variable resistor increases and decreases, the value of the resistance of said ballast resistor being so related to the resistance of said variable resistor that the reciprocal of the total resistance in said first circuit varies in approximately linear proportion to the relative humidity of said atmosphere, whereby the value of the last mentioned potential drop varies in approximately linear proportion to said relative humidity, and means responsive to current flow in said measuring circuit for varying the portion of said slide wire resistor included therein to thereby minimize said current flow.

6. Apparatus for linear measurement of relative humidity, comprising in combination a variable resistor varying in resistance in a predetermined manner from a maximum resistance to a minimum resistance as the relative humidity of the atmosphere to which said resistor is exposed increases through a predetermined range, a first closed circuit including said variable resistor, a coil, a ballast resistor, and a fixed resistor connected in series, a second closed circuit including a coil and a slide wire resistor connected in series, a common energizing means for said circuits comprising a winding in inductive relation with each of said coils, conductor means for connecting said winding across a source of alternating current, a detector circuit in which said fixed resistor and a variable portion of said slide wire resistor are connected in voltage bucking relation with each other and including a slider contact engaging and adjustable along said slide wire resistor, the value of the resistance of said ballast resistor being so related to the resistance of said variable resistor that the reciprocal of the total resistance in said first circuit varies in approximately linear proportion to the relative humidity of said atmosphere, whereby the value of the voltage drop across said fixed resistor varies in approximately linear proportion to said relative humidity, conducting means connecting said contact to one end of said fixed resistor, a conductor connecting the other end of said fixed resistor to said slide wire resistor at a fixed point along the latter, and means responsive to current flow in said detector circuit for adjusting said contact along said slide wire resistor in a direction and to the extent required to eliminate said current flow.

7. Apparatus for measuring relative humidity, comprising in combination a circuit including in series a source of circuit energizing current, a resistor varying in resistance in predetermined accordance with changes in the relative humidity of the atmosphere to which it is exposed, a ballast resistor having a resistance intermediate in value between the maximum and minimum resistances of the humidity responsive resistor, a slide wire resistor having a resistance much smaller than said ballast resistor, and means including a slider contact engaging and adjustable along said slide wire resistor for short circuiting a portion of said slide wire resistor and thereby varying the effective resistance of said slide wire resistor included in said circuit, and means for measuring the potential drop through the portion of said slide wire resistor in said circuit, the value of the resistance of said ballast resistor being so related to the resistance of the first mentioned resistor that the reciprocal of the total resistance in said circuit varies in approximately linear proportion to the relative humidity of said atmosphere, whereby the value of said potential drop varies in approximately linear proportion to said relative humidity.

8. Apparatus for measuring relative humidity, comprising in combination a circuit including in series a relative humidity resistor varying in resistance in a predetermined manner from a maximum resistance of several megohms to a minimum resistance less than 0.1 megohm as the relative humidity of the atmosphere to which said resistor is exposed increases through a predetermined range substantially less than 100%, a ballast resistor having a resistance value intermediate said maximum and minimum resistance values, a measuring resistor having a resistance which is a small fraction only of said minimum resistance, a source of alternating current, and electrical measuring means connected across a portion, at least, of said measuring resistor for measuring the current flow through the latter, the value of the resistance of said ballast resistor being sufficiently close to the value of the resistance possessed by said relative humidity resistor, when the latter is exposed to a relative humidity approximately in the middle of said range, to cause the reciprocal of the total resistance in said circuit to vary in approximately linear proportion to the relative humidity of said atmosphere, thereby to cause the value of the last mentioned current to vary in approximately linear proportion to said relative humidity.

9. Apparatus for measuring relative humidity, comprising in combination a circuit including in series a relative humidity resistor varying in resistance in a predetermined manner from a maximum resistance value to a minimum resistance value as the relative humidity of the atmosphere to which said resistor is exposed increases through a predetermined range, a ballast resistor having a resistance value intermediate said maximum and minimum resistance values, a measuring resistor having a resistance which is a small fraction only of said minimum resistance, and a source of energizing current, a compensating resistor varying in resistance in accordance with changes in the temperature of said atmosphere, electrical measuring means, and conductor means including said compensating resistor for connecting said measuring means across said measuring resistor for measuring said relative humidity and for increasing and decreasing the relative humidity measurements as the temperature of said atmosphere decreases and increases, respectively, the value of the resistance of said ballast resistor being so related to the resistance of said relative humidity resistor that the reciprocal of the total resistance in said circuit varies in approximately linear proportion to the relative humidity of said atmosphere, whereby there is produced across said measuring resistor a potential drop the value of which varies in approximately linear proportion to said relative humidity.

10. Apparatus for measuring relative humidity, comprising in combination a circuit including in series a relative humidity resistor varying in resistance in a predetermined manner from a maximum resistance value to a minimum resistance value as the relative humidity of the atmosphere to which said resistor is exposed increases through a predetermined range, a ballast resistor having a resistance value intermediate said maximum and minimum resistance values, a measuring resistor having a resistance which is a small fraction only of said minimum resistance, and a source of energizing current, a compensating resistor varying in resistance in accordance with changes in the temperature of said atmosphere, electrical measuring means and switch mechanism for periodically connecting said measuring means and said compensating resistor across said measuring resistor for measuring said relative humidity and for increasing and decreasing the relative humidity measurements as the temperature of said atmosphere decreases and increases, respectively, and for alternately operatively disconnecting said measuring means from said measuring resistor and for connecting it across said compensating resistor to thereby measure the temperature of said relative humidity resistor, the value of the resistance of said ballast resistor being so related to the resistance of said relative humidity resistor that the reciprocal of the total resistance in said circuit varies in approximately linear proportion to the relative humidity of said atmosphere, whereby there is produced across said measuring resistor a potential drop the value of which varies in approximately linear proportion to said relative humidity.

11. Apparatus for measuring relative humidity, comprising in combination a first circuit including in series a relative humidity resistor varying in resistance in a predetermined manner from a maximum resistance value to a minimum resistance value as the relative humidity of the atmosphere to which said resistor is exposed increases through a predetermined range, a ballast resistor having a resistance value intermediate said maximum and minimum resistance values, a measuring resistor having a resistance which is a small fraction only of said minimum resistance, and a source of circuit energizing current, electrical means including an adjustable potentiometer bridge measuring circuit having terminal conductors for connection across a portion at least, of said measuring resistor for measuring the current flow through the latter, a second bridge circuit through which one of said terminal conductors is connected to said measuring resistor and including a resistor varying in resistance in accordance with changes in the temperature of said atmosphere and thereby increasing and decreasing the relative humidity measurements as the temperature of said atmosphere decreases and increases, respectively, and separate sources of energizing current included in each of said potentiometer and second bridge circuits, said second bridge circuit including a slide wire resistor and an associated slider contact engaging and adjustable along said slide wire resistor and forming an adjustable part of the terminal conductor connection through which said potentiometer circuit is connected to said measuring resistor and operative when adjusted to vary the increases and decreases in the relative humidity measurements resulting from a change in the temperature of said relative humidity resistor.

12. Apparatus as specified in claim 11, in which said second bridge circuit includes a second slide wire resistor and an associated slider contact engaging and adjustable along the last mentioned slide wire resistor and forming a part of the terminal conductor connection of said measuring means across said measuring resistor, one of said slide wire resistors and its associated slider contact forming means for effecting a relatively fine adjustment, and the other slide wire contact forming a means for effecting a relatively coarse adjustment of the extent of change in the relative humidity measurements produced by changes in the temperature of said atmosphere.

13. Apparatus for measuring relative humidity, comprising in combination a first circuit including in series a relative humidity resistor varying in resistance in a predetermined nonlinear manner from a maximum resistance value to a minimum resistance value as the relative humidity of the atmosphere to which said resistor is exposed increases through a predetermined range, a ballast resistor having a resistance value intermediate said maximum and minimum resistance values, a measuring resistor having a resistance which is a small fraction only of said minimum resistance, and a source of energizing current for said circuit, electrical measuring means comprising an adjustable potentiometric bridge measuring circuit having terminal conductors for connection across at least a portion of said measuring resistor for measuring the current flow through the latter, a second bridge circuit through which one of said terminal conductors is connected to said measuring resistor and including a resistor varying in resistance in accordance with changes in the temperature of said atmosphere and thereby increasing and decreasing the relative humidity measurements as the temperature of said atmosphere respectively decreases and increases, separate sources of energizing current included in each of said potentiometer and second bridge circuits, each of said three sources of circuit energizing current being a separate transformer secondary winding, and a common transformer primary winding in inductive relation with each of said secondary windings.

14. Apparatus for linear measurement of relative humidity, comprising in combination a variable resistor varying in resistance in a predetermined manner from a maximum resistance to a minimum resistance as the relative humidity of the atmosphere to which said resistor is exposed increases through a predetermined range, a first closed circuit including said variable resistor, a ballast resistor, a first transformer secondary winding, and a fixed resistor connected in series, a second closed circuit including a second transformer secondary winding and at least a portion of a slidewire resistor connected in series, transformer primary winding means electrically coupled to said first and second transformer secondary windings, terminal conductors for connecting said transformer primary winding means to a source of alternating current, detector means electrically coupled to both of said closed circuits and arranged to compare the voltage drop across said fixed resistor to the voltage drop produced across a variable portion of said slidewire resistor, the value of the resistance of said ballast resistor being so related to the resistance of said variable resistor that the reciprocal of the total resistance in said first circuit varies in approximately linear proportion to the relative humidity of said atmosphere, whereby the value of said voltage drop across said fixed resistor varies in approximately linear proportion to said relative humidity, and means responsive to actuation of said detector means resulting from inequalities in said voltage drops for adjusting said slidewire resistor in a direction and to an extent required to eliminate said inequality.

References Cited in the file of this patent

UNITED STATES PATENTS

| | | |
|---|---|---|
| 2,047,638 | Kott | July 14, 1936 |
| 2,285,421 | Dunmore | June 9, 1942 |
| 2,295,570 | Dunmore | Sept. 15, 1942 |
| 2,381,299 | McCulloch | Aug. 7, 1945 |
| 2,396,420 | Hayward et al. | Mar. 12, 1946 |
| 2,404,891 | Schmitt | July 30, 1946 |
| 2,424,146 | Caldwell et al. | July 15, 1947 |
| 2,446,153 | Belcher | July 27, 1948 |
| 2,501,377 | Cherry | Mar. 21, 1950 |

FOREIGN PATENTS

| | | |
|---|---|---|
| 533,381 | Great Britain | Feb. 12, 1941 |